United States Patent [19]

Heinrich

[11] 4,418,538

[45] Dec. 6, 1983

[54] METHOD AND APPARATUS FOR OPERATING A SELF-STARTING AIR HEATING SYSTEM

[75] Inventor: Charles E. Heinrich, Mentor, Ohio

[73] Assignee: TRD Inc., Cleveland, Ohio

[21] Appl. No.: 215,563

[22] Filed: Dec. 11, 1980

[51] Int. Cl.³ .......................................... F01K 13/02
[52] U.S. Cl. ...................................... 60/646; 60/657; 60/664
[58] Field of Search ................. 60/646, 656, 657, 665, 60/664, 667

[56] References Cited

U.S. PATENT DOCUMENTS 1,551,438  8/1925  Staley ............................... 60/656 X
2,596,968  5/1952  Harris et al. ......................... 60/656
3,393,515  7/1968  Tabor et al. ...................... 60/646 X

*Primary Examiner*—Allen M. Ostrager
*Assistant Examiner*—Stephen F. Husar

[57] ABSTRACT

A self-starting, fuel fired, air heating system including a fuel burner fired vapor generator, a turbine, and a condenser connected in a closed circuit such that the vapor output from the vapor generator is conducted to the turbine and then to the condenser where it is condensed for return to the vapor generator. The turbine drives an air blower which passes air over the condenser for cooling the condenser and heating the air. Also, a condensate pump is driven by the turbine. The disclosure is particularly concerned with a method and apparatus which on start-up prevents the vapor generator's vapor output from being conducted to the turbine until a predetermined pressure differential has been achieved. However, after the vapor flow is once permitted, it cannot again be prevented until after the fuel burner has been shut off and restarted.

5 Claims, 3 Drawing Figures

METHOD AND APPARATUS FOR OPERATING A SELF-STARTING AIR HEATING SYSTEM

The Government has rights in this invention pursuant to Contract No. 468952-5 awarded by the U.S. Department of Energy.

The subject invention is directed toward the art of vapor generating systems and, more particularly, to a fuel fired, closed loop, hermetically sealed Rankine cycle turbine power unit.

The invention is particularly suited for use in a totally self-contained, self-powered air heating system for residential space heating requirements and will be described with particular reference thereto; however, as will become apparent, the invention is capable of broader application and could be used in a variety of different Rankine cycle power units.

A recently developed residential heating unit includes a closed loop, hermetically sealed vapor generator and turbine unit (comprising a Rankine cycle power unit) fired by a gas fuel burner. The unit generates relatively low pressure steam which is used to drive the turbine which in turn drives an air circulating blower and a condensate return pump. The vapor discharging from the turbine is passed through a condenser or heat exchanger position in the air flow stream and provides the primary means of heating the air supplied to the heated rooms or space.

As can be appreciated, there is frequent cycling of the operation of the vapor generator turbine unit because of the usual on/off thermostat response to the heating requirements of the space being heated. Consequently, the vapor generator turbine unit must be started and stopped at somewhat frequent intervals if desired temperatures within a suitable range are to be maintained within the heated space.

In the operation of any vapor generator system, varying loads and on/off cycling place special requirements on the system. Additionally, in systems of the type referred to as employed in residential heating applications, the turbine and vapor generator unit are preferably operated at very low pressure and, at times, at subatmospheric pressure. For example, in one known type of unit the fluid or liquid within the vapor generator is vaporized to a pressure of approximately 1.7 atmospheres (absolute). As the vapor enters the turbine and expands, it drops to a pressure of approximately 0.4 atmospheres (absolute). After expansion and subsequent condensation it is conducted to an intake of a condensate return pump and its pressure raised to approximately 2 atmospheres to return as liquid to the vapor generator.

A particular problem associated with a system of the type described is that there is a distinct need to start and accelerate to full speed as soon as possible the turbine and its driven air circulating blower. The need for a rapid start-up is to provide cooling air in sufficient quantity to be able to condense the vapor coming from the exhaust of the turbine. If adequate condensation does not take place, the pressure differential across the turbine required for adequate steady state operation fo the turbine will not be maintained, or in the case of a "hot start", will not be achieved and thermal suffocation takes place causing shutdown.

When the system is cycled off and the burner shuts down, there is still substantial heat in the system. If this heat is not removed and added to the heated air stream, it will be lost up the burner vent and/or conducted to the space ambient to the system. Additionally, if the heat is not removed fairly rapidly, the vapor generating and condensing sections do not achieve pressure equilibrium promptly. This prevents condensate from returning to the sump rapidly and lengthens the time the system must remain shut down prior to restarting.

The subject invention provides a method and apparatus for operating a system of the type described which overcomes the noted problems. Briefly, according to one aspect of the invention, the method and operation includes on startup maintaining the vapor outlet from the vapor generator closed until the vapor pressure differential between the vapor generator reaches a predetermined minimum level. On an "off-cycle" or shut down of the vapor generator burner, however, the outlet is maintained open even after the pressure differential drops below the predetermined minimum pressure differential.

This method of operation assure that the turbine is placed in operation only under a full flow of vapor, will being allowed to coast down on an off-cycle. This allows maximum usage of the heat still remaining in the vapor generator after burner cut-off, since as the pressure in the vapor generator drops off, it still drives the turbine and blower. This cools down the condensing portion of the system while also imparting heat to the residence air stream. Also, the rapid cooling of the condensing section and the vapor generator allows temperature equilibrium to be achieved rapidly. Consequently, after the condensate pump ceases to function due to slow or stopped speed, the residual condensate in the system to drain by gravity back to the vapor generator for another cycle. A restart can then take place promptly if required.

According to a further aspect of the subject invention, the preferred apparatus for carrying out the noted method includes a valve having a pressure sensitive diaphragm and linkage means which prevents the valve from opening until the pressure differential across the valve reaches a predetermined minimum. However, the means prevents the valve from closing until the vapor generator burner is again started on a subsequent "on-cycle."

The preferred structure and method provided for achieving the above objects and desired results will become apparent from the following description when read in conjunction with the accompanying drawings wherein.

Figure 1:
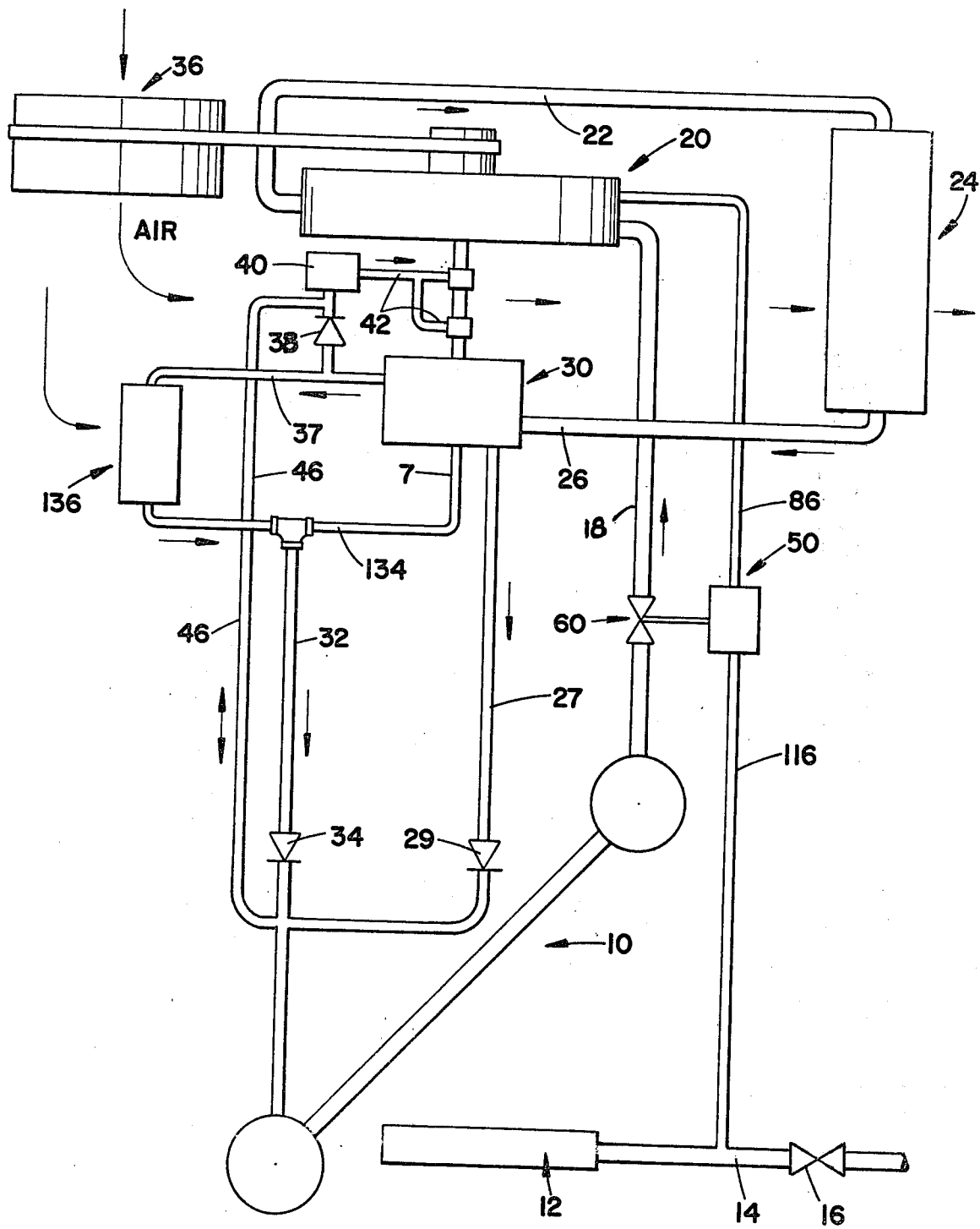
FIG. 1 is an overall diagrammatic view showing a typical embodiment of a self-contained, fuel-fired turbine-vapor generator unit adapted for residential heating and including features of the invention.

Referring more particularly to the drawings wherein the showing are for the purpose illustrating a preferred embodiment of the invention only, and not for the purpose of limiting the same. FIG. 1 shows a relatively conventional vapor generator 10 which is fired by a gas burner 12 connected to a source of gas through a line 14 controlled by a main control valve 16. Vapor produced by the vapor generator 10 is conducted through a line 18 to a turbine or similar rotary, vapor power expander, 20. As can be appreciated, in passing through the turbine 20 the vaporized fluid expands, performs work, and drops in pressure. From the turbine, the discharged vapor is passed through line 22 to a heat exchanger or condenser 24 where it is condensed back to a liquid and supplied through a line 26 to a sump 28. The liquid within the sump 28 can flow by gravity through line 27 and check valve 29 to the intake of vapor generator 10. However, under most operating conditions, the liquid is pumped from the sump 28 by a centrifugal condensate pump 30 which discharges through a line 32 to a lower or inlet end of the vapor generator 10. As shown, a check valve 34 is positioned in line 32 to prevent reverse flow of liquid from the vapor generator 10.

In the embodiment under consideration, the turbine 20 has its shaft directly connected to the condensate pump 30. Consequently, whenever the turbine 20 is operating it is also driving the condensate pump 30. Additionally, the turbine 20 is connected through a belt drive with a fan or blower 36 positioned and arranged to take air from the space being heated and pass it over the turbine housing and the condenser or heat exchanger 24 for return back to the heated space.

As can be appreciated, in order to meet the varying heating requirements of typical residence or other space heating needs, the unit must have a varying heat energy output. This can be accomplished by modulating the firing of the generator or, alternatively, by cycling the unit on and off. In the subject embodiment a simple on/off control system is disclosed, which will operate in conjunction with known types of on/off thermostats. As can be appreciated, with frequent on/off cycling of the unit, frequent start-up and shut-down of the system results. Additionally, because of the desire to use the system for residential heating and because of efficiency considerations, it is desirable to have the system operate at very low and even subatmospheric pressures. Moreover, if the turbine and blower rotary motion were to cease immediately upon discontinuation of burner firing, a substantial amount of heat energy would remain in the system to be lost by natural draft up the burner vent and not supplied to the heated space.

An additional requirement of a system of the type described is that the turbine bearings be properly lubricated whenever the turbine is operated. While it would be possible to provide a separate independently driven pump unit for supplying turbine bearing lubricant, provision of such a pump would obviate one of the major advantages of the system of the type described. That is, the subject system is preferably arranged and constructed such that it is completely self-contained and needs no additional external power such as electricity. For this reason, the condensate pump 30 has a circuit connection to ensure flow of fluid to the turbine bearings. As shown the discharge line 37 from the condensate pump 30 is connected through a check valve 38 and a fluid filter 40 with a line 42 leading to the turbine bearings. The turbine bearings are relatively conventional, fluid lubricated bearings (not shown) which carry the radial loads of the turbine. The bearings have narrow passages which offer a substantial restriction to fluid flow and the fluid passing through the bearings returns through lines (not shown) to the sump 28. As can be appreciated, so long as the turbine and condensate pump are operating, a suitable supply of bearing lubricant fluid is supplied to the bearings. However, on vapor generator start-up when the turbine and, accordingly, the condensate pump are not operating, it is still necessary to have lubricant fluid to the bearings or otherwise the turbine would start-up with dry bearings and produce bearing damage.

To assure lubricant flow to the bearings when the vapor generator is being started up, a line or tube 46 is directly connected from the vapor generator to a point between check valve 38 and filter 40. Additionally, a vapor pressure hold-back valve 50 is positioned in line 18. The preferred form of valve 50 will subsequently be described and its function explained in detail relative to other operations of the vapor generator; however, for present purposes it is sufficient to note that the holdback valve 50 is controlled so that it does not open until the vapor generator has reached a predetermined operating pressure level. Consequently, the turbine 20 does not receive vapor until the vapor generator has attained a predetermined pressure. While pressure is building up within the vapor generator a small portion of the fluid within the generator is forced by vapor generator pressure through line 46 and filter 40 to the bearings 42. Thus, a full bearing lubricant fluid supply is passing through the bearings prior to the time that the holdback valve 50 opens and turbine rotation begins. When turbine rotation begins, the condensate pump 30 is also driven and discharges fluid through check valve 38 to filter 40 and thence to the bearings 42. In addition, as can be appreciated, even when the vapor generator firing ceases, a supply of vapor will continue to be supplied for a period of time. The direct interconnection of the turbine and the condensate pump 30 assures that so long as the turbine and condensate pump are rotating sufficient to overcome bearing lubrication system resistance, bearing lubricant fluid will be supplied through check valve 38, filter 40 and line 42.

As mentioned earlier, the described system preferably operates a very low and, during certain portions of the cycle, subatmospheric pressures. The fluid moving through the lower pressure portions of the cycle, specifically, the condensate return lines, is at or very near its vaporizing point because of the temperature and pressure relationship. Thus, under certain cycle conditions the vapor in this portion of the circuit can vaporize or flash. If flashing takes place, the fluid supplied to the condensate pump or taken into the intake of the condensate pump can vaporize and a vapor lock could take place in the pump.

Figure 3:
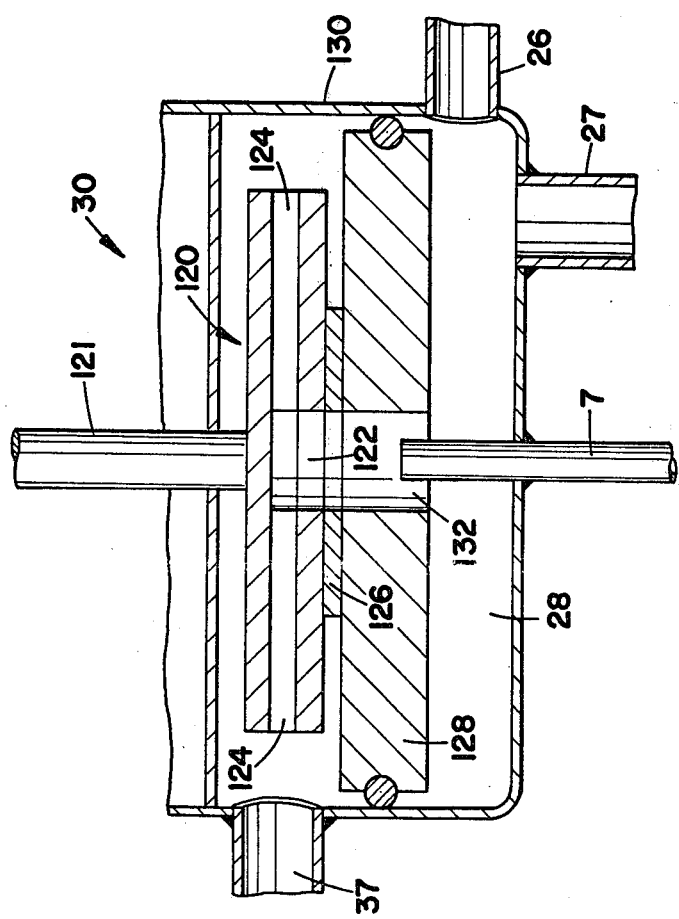
FIG. 3 is an enlarged cross-sectional view of a preferred form of condensate pump used in the system of FIG. 1.

To understand how undesired flashing is prevented in the subject system, reference is made to FIGS. 1 and 3. As best shown in FIG. 3, the condensate pump 30 includes a pump rotor 120 carried at the lower end of turbine shaft 121. Rotor 120 includes a central intake opening 122 and a plurality of radially extending passages 124. The downward thrust of the turbine and the pump rotor 120 are carried by suitable land or thrust bearing members 126 supported upon a carbon disc 128 sealingly connected within the lower end of the housing 130 which defines the sump 28.

Condensate returning to the sump 28 through line 26 is drawn into the pump rotor 120 through the opening 132. It is impelled centrifugally through paths 124 to the outlet line 37. At normal operating speed the condensate pump 30 has a capacity greater than the fluid required to operate the vapor generator and the turbine. Consequently, the condensate pump will try to pump the fluid within sump 28 to a level below the inlet 132 to a pump housing. At this level suction will break at the inlet and the pump can no longer draw fluid into the rotor. To prevent a vapor lock condition when the sump starts filling again, the subject invention provides an eductor jet 7 which is connected to a line 134 with a discharge 37 of the condensate pump. Consequently, so long as the pump is operating a constant priming flow of liquid is provided to the inlet.

Even with the eductor operatings, the condensate pump could lose its prime as a result of flashing from the heat of the turbine exhause and the like. For this reason it is imperative that line 134 include a portion which can be referred to as a heat exchanger or cooling section 136 positioned in the cool return air flow upstream of the condenser in an air flow direction. This heat exchanger 136 cools the condensate which is supplied through the eductor. This cooled fluid prevents formation and/or continuation of the vapor lock or flashing at the condensate pump inlet.

As mentioned earlier, hold-back valve 50 is arranged to prevent flow of vapor from the generator 10 to the turbine 20 until the generator has reached predetermined pressure level. In addition, hold-back valve 50 is arranged such that upon termination of the supply of fuel to the burner 12 it will not close even after all of the vapor being generated in the vapor generator has been passed through the turbine and the entire unit is cooled down substantially by the flow of air from blower 36 through the unit. This assures that all heat generated within the boiler unit is supplied to the heated space. That is, all heat is extracted from the unit prior to the time it completely shuts down so that draft heat losses by flow through the unit and up the stack are substantially eliminated or greatly reduced.

Figure 2:
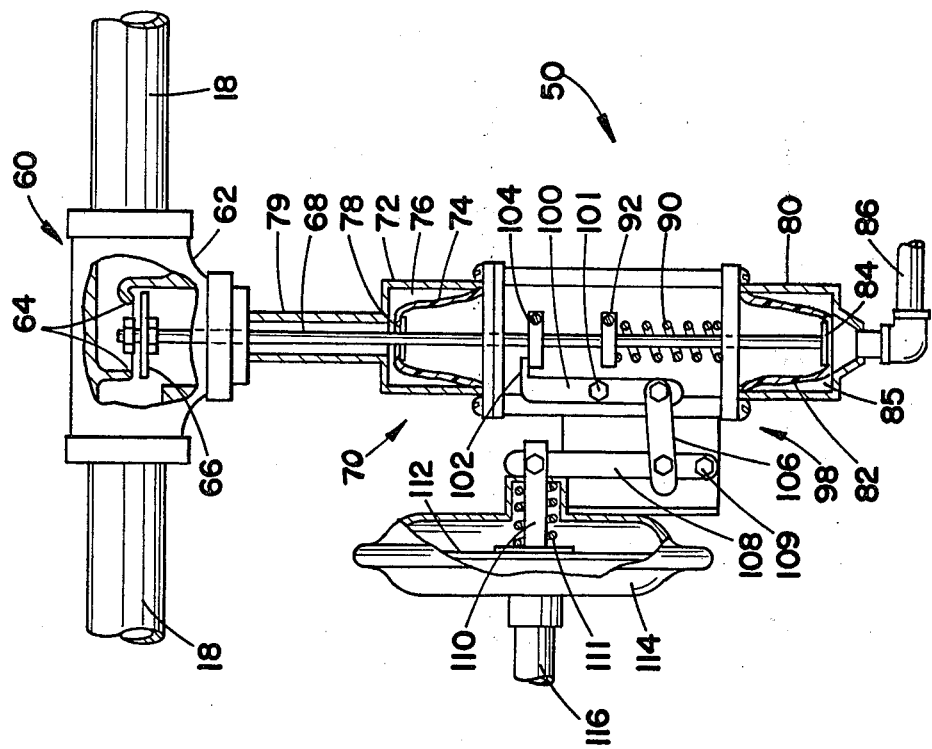
FIG. 2 is a detailed view of a vapor pressure holdback valve formed in accordance with the invention and used in the system of FIG. 1.

Many different types of hold-back valves systems could be provided for carrying out the inventive method. However, the preferred form of hold-back valve according to the subject invention is shown in FIG. 2. As shown therein, the hold-back valve comprises a standard valve unit 60 including a body 62 and a seat 64 which is opened and closed by a valve disc 66. The valve disc 66 is slidingly operated by a push rod 68 connected to an operating assembly 70. The operating assembly 70 includes a first housing 72 having a bellows element 74 mounted therein and cooperating with the housing 72 to define an external sealed pressure chamber 76. The push rod 68 passes through bellows 74 and is sealed relative thereto by being welded or otherwise sealing connected to the upper end of the bellows at point 78. Pressure within line 18 on the upstream side of valve 60 is permitted to act within chamber 76 by passing about the push rod 68 and within the tube 79.

At the opposite end of the operating unit 70 a second chamber defining housing member 80 is formed and likewise has a bellows 82 mounted therein in a manner to provide a sealed chamber 85. The lower end of the push rod 68 is welded or otherwise positively connected to the bellows member at 84. chamber or pressure space 85 is connected through a line 86 to the lower pressure side of the turbine housing so that turbine discharge pressure acts against the bellows 82.

The push rod 68 is continually biased to a valve closing direction by a spring 90 which acts against an adjustable stop 92 formed or carried on the push rod 68. Selective movement of the stop 92 acts to vary the spring force.

As can be appreciated, by adjustments of the biasing force of spring 90 it is possible to preset the difference in pressure between the vapor generator and the turbine housing required to cause valve opening. To explain, note that the pressure within the vapor generator acts against bellows 74. This is counter-balanced by the spring pressure 90 and the turbine housing pressure as sensed by bellows 82. It should also be appreciated that under negative pressure within the turbine housing the pressure upon bellows 82 is negative also thereby increasing the forces acting against spring 90. Thus, it is impossible to maintain a constant pressure differential between the turbine outlet pressure and the vapor generator pressure.

The arrangement thus far described prevents opening of the valve element 66 until the generator has reached some predetermined pressure differential relative to the turbine outlet. This assures immediate start-up of the turbine without a slow and gradually increasing vapor supply to the turbine which would produce improper start-up and could result in a substantial amount of vapor passing through the turbine prior to the turbine's start-up.

To assure that the valve 60 remains open even after the burner 12 has stopped firing, an actuating assembly 98 is interconnected between the valve operator 70 and the gas supply to the burner. Note that the assembly 98 includes a first lever member 100 which is suitably mounted from a bracket 99 for pivotal movement about point 101. Member 100 has inwardly extending finger portion 102 which (when in the position shown in FIG. 2) extends over a stop member 104 carried on push rod 68. The stop member 104 and finger 102 are related such that the valve cannot fully close with finger 102 in the position shown. The member 100 is pivoted in a counterclockwise direction to remove finger 102 from its stop position by a link 106 connected between member 100 and a second pivoted lever 108. Lever 108 is pivoted about point 109 and has its upper hand connected to an operating rod 110 extending from a gas pressured diaphram assembly 112. As shown, pressure of gas supplied to burner 12 is also conducted to the pressure chamber 114 of diaphram assembly 12. The operation of the hold-back valve 50 and its relationship to the overall functioning of the system can best be understood by joint reference to FIGS. 1 and 2. When the valve is in the solid line position shown in FIG. 2, the previously mentioned finger 102 prevents closing of the valve at element 66. Thereafter, when there is a demand for heating and main gas valve 16 opens, gas pressure is supplied through line 116 to the left side of diaphram 112. This causes the diaphram 112 to move to the right against the bias of spring 110 pivoting lever 108 in a clockwise pivoting of the lever 110. This retracts the finger 102 from above the stop 104 and permits the valve element 66 to be moved to the closed position by the bias of spring 90. Since the burner has just begun firing vapor pressure has not yet built up in the vapor generator. Accordingly, the valve remains closed and as boiler pressure builds up fluid is supplied through line 46, filter 40 and line 42 to lubricate the turbine bearings. When a suitable pressure in line 18 has been reached, the pressure within the chamber 76 is sufficient to overcome the bias of spring 90 and the valve 66 moves to an open position. Thereafter, when the main control valve 16 is closed either manually or in response to a temperature control signal from the heated space, the bias of spring 110 causes the diaphram to move to the left and the lever 108 to be moved in a counterclockwise direction about point 109. This movement causes the stop finger 102 to be pivoted to the right to the position above stop member 104. As the generation of vapor within the vapor generator 10 decreases, the valve member will move toward the closed position until the stop 104 engages finger 102. At this time the valve is still open and all vapor within the vapor generator continues to flow therefrom maintaing continued rotation of the turbine and the blower 36 and the pump 30. The continued flow of air from blower 36 over the heated surfaces within the unit and the condenser surface 24 extracts the last heat from the unit and conducts it to the heated space. Thus, the hold-back valve prevents the start-up of the turbine and blower until a predetermined pressure is reached while simultaneously permitting continued flow of vapor from the unit even after firing has ceased, thereby substantially increasing the efficiency of the unit.

Having thus described my invention, I claim:

1. In a self-starting air heating system including a fuel burner fired vapor generator, a turbine, and a condenser connected in a circuit such that the vapor output from the generator is conducted to said turbine and then from an outlet from said turbine to said condenser where it is condensed and returned to said boiler, and further including an air blower means driven by said turbine for causing a flow of air over said condenser, and a condensate pump also driven by said turbine for returning the condensed vapor to the vapor generator, the improved method of operation comprising maintaining the circuit portion between said vapor generator and said turbine closed to prevent the vapor output of said vapor generator from passing to said turbine until the pressure differential between the turbine outlet and the vapor generator reaches a minimum predetermined level and after opening said portion of the circuit maintaining it open until after the flow of fuel to said fuel burner has been shut-off and restarted.

2. The method as defined in claim 1 including the step of closing said portion of said circuit substantially simultaneously with the restart of the flow of fuel to said fuel burner.

3. In a self-starting air heating system including a fuel burner fired vapor generator, a turbine, and a condenser connected in a circuit such that the vapor output from the generator is conducted to said turbine and from an outlet from said turbine to said condenser where it is condensed and returned to said boiler, and further including an air blower means driven by said turbine for causing a flow of air over said condenser, and a condensate pump also driven by said turbine for returning the condensed vapor to the vapor generator, the improvement comprising valve means including pressure responsive control means for maintaining the circuit portion between said vapor generator and said turbine closed to prevent the vapor output of said vapor generator from passing to said turbine until the pressure differential between the outlet from said turbine and said vapor generator reaches a minimum predetermined level and after opening said portion of the circuit maintaining it open until after the flow of fuel to said fuel burner has been shut-off and restarted.

4. The improvement as defined in claim 3 wherein said control means includes means responsive to the flow of fuel to said burner for latching said valve means in an open position upon termination of the flow of fuel to said burner.

5. The improvement as defined in claim 3 wherein said control means includes a pressure responsive diaphragm member for moving said valve means between open and closed positions.

* * * * *